Figure 1:
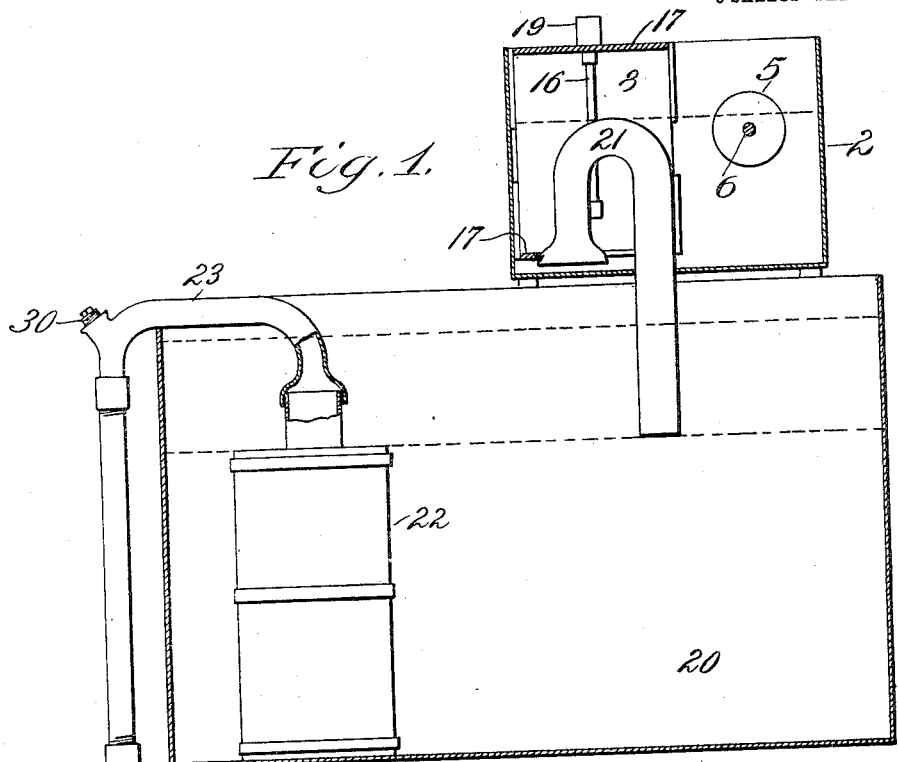

No. 879,856. PATENTED FEB. 25, 1908.
C. R. DARNALL.
APPARATUS FOR PURIFYING WATER.
APPLICATION FILED AUG. 27, 1906.

3 SHEETS—SHEET 1.

Witnesses
Inventor
Carl Roger Darnall
By Julian C. Dowell
his Attorneys.

No. 879,856. PATENTED FEB. 25, 1908.
C. R. DARNALL.
APPARATUS FOR PURIFYING WATER.
APPLICATION FILED AUG. 27, 1906.

3 SHEETS—SHEET 2.

Witnesses

Inventor
Carl Roger Darnall
By his Attorneys

No. 879,856.

PATENTED FEB. 25, 1908.

C. R. DARNALL.
APPARATUS FOR PURIFYING WATER.
APPLICATION FILED AUG. 27, 1906.

3 SHEETS—SHEET 3.

Witnesses

Inventor
Carl Roger Darnall

UNITED STATES PATENT OFFICE.

CARL ROGER DARNALL, OF WASHINGTON, DISTRICT OF COLUMBIA.

APPARATUS FOR PURIFYING WATER.

No. 879,856.      Specification of Letters Patent.      Patented Feb. 25, 1908.

Application filed August 27, 1906. Serial No. 332,250.

*To all whom it may concern:*

Be it known that I, CARL ROGER DARNALL, a citizen of the United States, residing at Washington, in the District of Columbia, have invented certain new and useful Improvements in Apparatus for Purifying Water; and I do hereby declare the following to be a full, clear, and exact description of the invention, such as will enable others skilled in the art to which it appertains to practice, make, and use the same.

This invention relates to the art of purifying water by the agency of chemical substances to form a precipitate in the water, in conjunction with the further agency of filtration.

The invention seeks to simplify, expedite and increase the efficacy of such processes, as well as to provide a more efficient, practicable and convenient apparatus for practicing the same; the chief objects being to attain thereby a more perfect purification and produce filtered water of unimpaired flavor and quality, freed from bacteria or germs as well as foreign matter and other impurities, and free also from chemical substances in solution; to obtain better means of supplying and mixing the chemical ingredients with the water; and to render the operation automatic in respect to treatment of either a continuous or interrupted flow of feed-water, as from a water-main or other source of supply, the treatment being uniformly proportionate to the amount of water supplied.

The improved method of purifying water herein set forth constitutes the subject matter of a divisional application filed by me March 20, 1907, Serial No. 363384, for which reason the claims of the present application are confined to the apparatus.

In practicing my invention, I introduce into and commingle with the water substantially definite or measured amounts of separate chemicals, a precipitant and re-agent thereof (both preferably in the form of solutions), and which by their chemical reaction produce a bulky, flocculent precipitate or coagulum in which are enmeshed any bacteria as well as suspended particles or other impurities present in the water; the said chemicals or ingredients being also of such relative proportions or in such relative quantities as to substantially neutralize each other, thereby avoiding any residue of free matter (as alum, iron, &c.) in solution, or any noxious flavor or other effect therefrom. The liquid is then conducted off and filtered in such manner as to remove such precipitate together with the impurities collected therein.

The chemicals which I employ are non-poisonous and non-deleterious, thereby avoiding any stringent or irritant effects; for which purpose I find it preferable to use two or more suitable reactionary and neutralizing salts, of which the following are given as examples, together with appropriate proportions of their respective ingredients. In these examples, the two solutions, that is the precipitant and the reagent therefor, will be conveniently designated as solution (*a*) and solution (*b*).

I. (*a*) aluminium sulfate, 5 oz. in one gal. water; (*b*) sodium bicarbonate, 4¼ oz. in one gal. water; or sodium carbonate, 7½ oz.; or potassium bicarbonate, 5 oz.; or potassium carbonate, 3½ oz.

II. (*a*) ferrous sulfate, . oz. in one gal. water; (*b*) potassium permanganate, ¾ oz. in one gal. water.

III. (*a*) aluminium and potassium sulfate (alum), 8 oz. in one gal. water; (*b*) sodium bicarbonate, 4½ oz. in one gal. water; or sodium carbonate, 7½ oz.; or potassium bicarbonate, 5 oz.; or potassium carbonate, 3½ oz.

IV. (*a*) aluminium and ammonium sulfate (ammonia alum), 8 oz. in one gal. water; (*b*) sodium bicarbonate, 4½ oz. in one gal. water; or sodium carbonate, 7½ oz.; or potassium bicarbonate, 5 oz.; or potassium carbonate, 3½ oz.

V. (*a*) ammonio-ferric sulfate, 8 oz. in one gal. water; (*b*) sodium bicarbonate, 4½ oz. in one gal. water; or sodium carbonate, 7½ oz.; or potassium bicarbonate, 5 oz.; or potassium carbonate, 3½ oz.

VI. (*a*) ferric chlorid, 6 oz. in one gal. water; (*b*) sodium bicarbonate, 6 oz. in one gal. water; or sodium carbonate, 10 oz.; or potassium bicarbonate, 7 oz.; or potassium carbonate, 5 oz.

For effective treatment of the water, these solutions would preferably be supplied in about the proportions of two and one-half drams of each solution to every gallon of water passing through the apparatus. It will be understood, however, that any such substances may be employed as will produce the results desired, and in such relative proportions as to form the aforesaid precipitate by the reaction of the solutions, while at the same time substantially neutralizing each other, which proportions will depend of course upon the nature of the particular ingredients or chemicals used, determined according to well-known laws. I do not confine myself, therefore, to any specific substances and proportions, either as before stated or otherwise.

In conducting the operation, the raw water to be treated, furnished from a main or other source, is received in a suitable vessel, wherein the two solutions are separately but preferably simultaneously introduced, the inflowing of the several liquids causing their admixture and distribution of the solutions throughout the bulk of the water, while the meeting of said solutions causes their reaction and produces the aforesaid precipitate. In said vessel, the flow of the incoming water is automatically controlled to avoid the rise of water above a certain maximum level; and when such level is attained, the liquid is discharged by a siphon into a receptacle located at a lower level, the discharge through the siphon continuing until the upper vessel is substantially emptied, or until the level of the liquid in said upper vessel falls below the mouth of the inner or shorter branch of the siphon. Thus a uniform or definite quantity of water is intermittently received in and discharged from the upper vessel; and in said vessel the supply of the chemical solutions is so automatically controlled as to furnish a uniformly proportionate amount of each solution to every such quantity of water that flows into and siphons out of said vessel. For example, assuming each discharge to or from the upper vessel to be about ten gallons, then the reservoirs containing the chemical solutions would desirably be arranged to feed about twenty-five drams of each solution into the said ten gallons of water as it is received into the upper vessel; although of course these proportions are not essential, and are given merely to illustrate a satisfactory practice. The discharge through the siphon increases the admixture of the fluids, thus insuring the distribution of chemicals and their reaction throughout the entire body of the water. From the said lower receptacle, the liquid is again transferred by siphonic action through a suitable filter or filters, thereby separating the precipitate together with the impurities collected therein.

Reference will now be had to the accompanying drawings, which form a part of this specification, and wherein is illustrated one preferred form of apparatus embodying my invention; it being understood however that the invention is susceptible of embodiment in various forms, preserving substantially the principle and essential character of such apparatus, and hence I do not confine myself to this or any specific construction, or arrangement of parts, or the details and accessories thereof.

Figure 2:
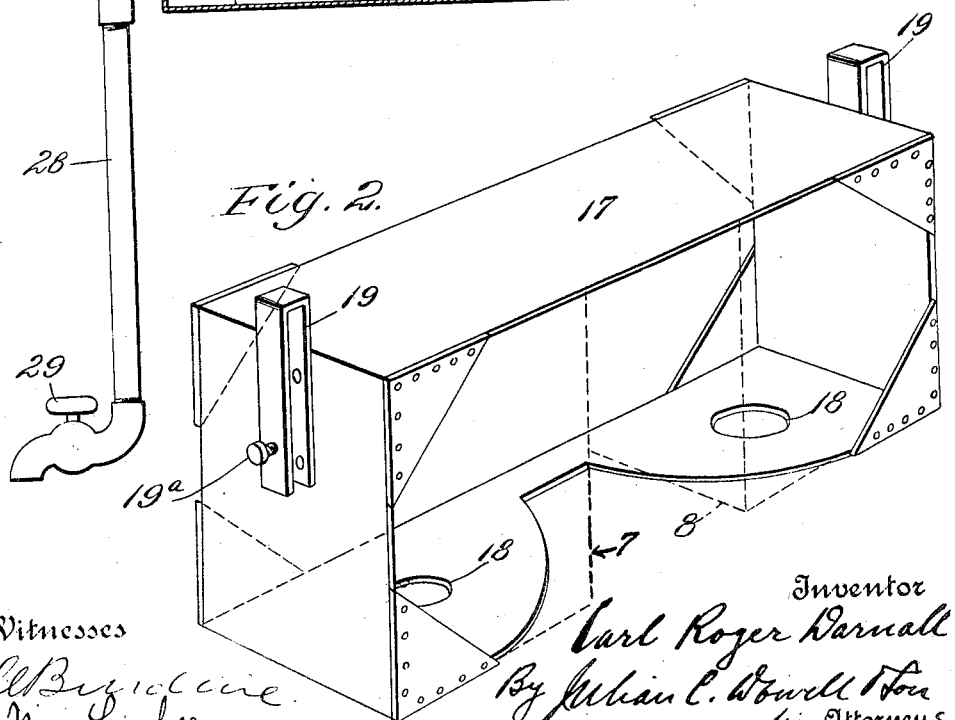
Figure 3:
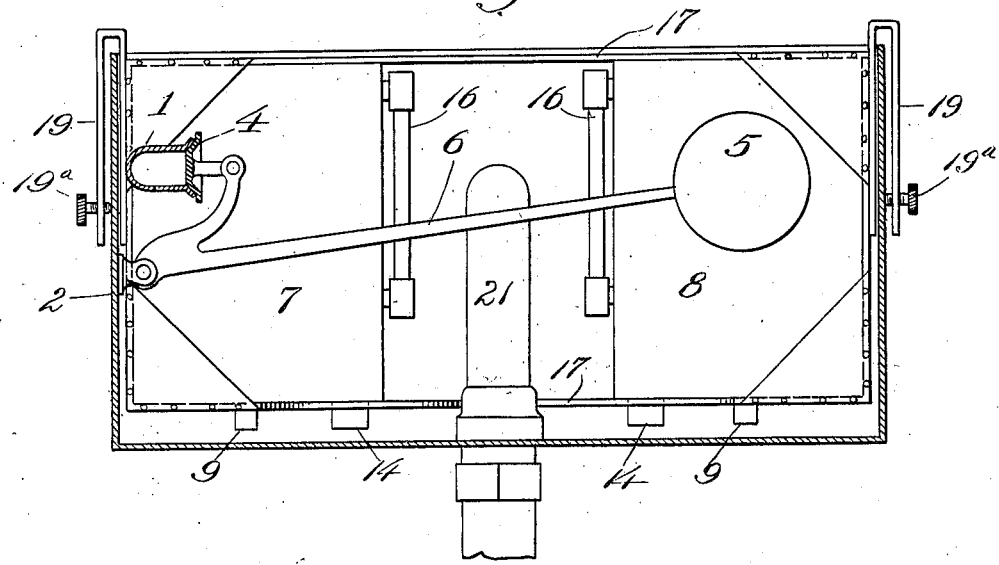
Figure 4:
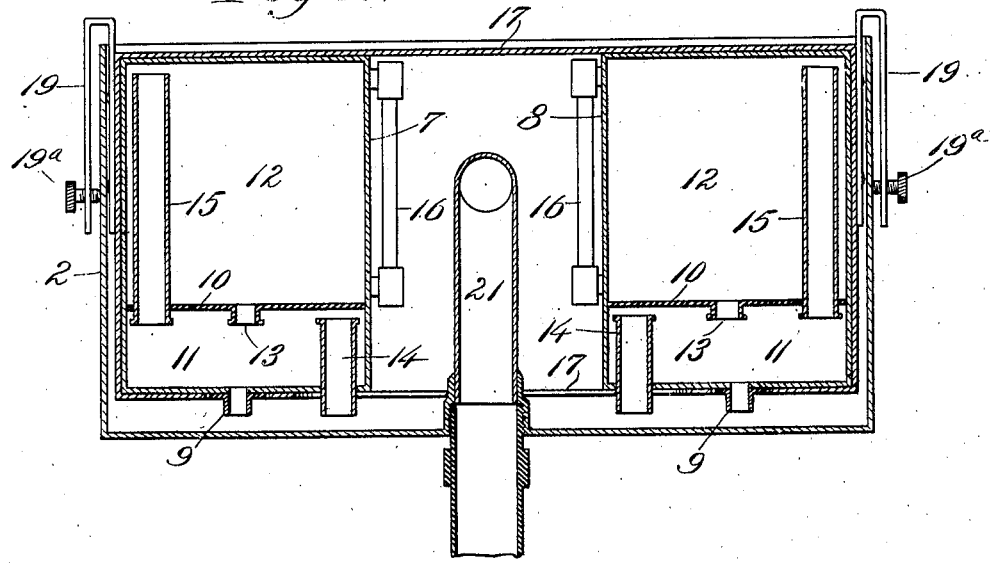
Figure 5:
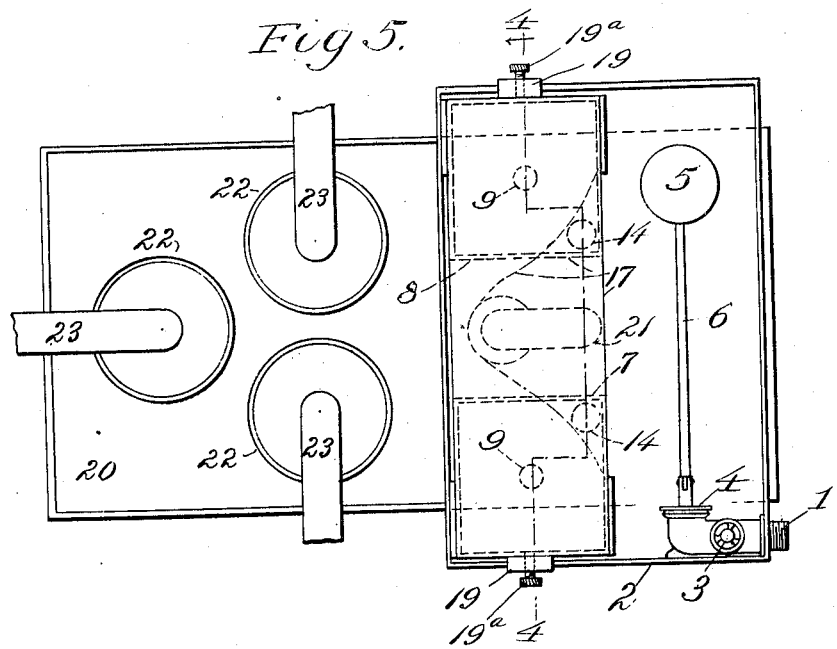
Figure 6:
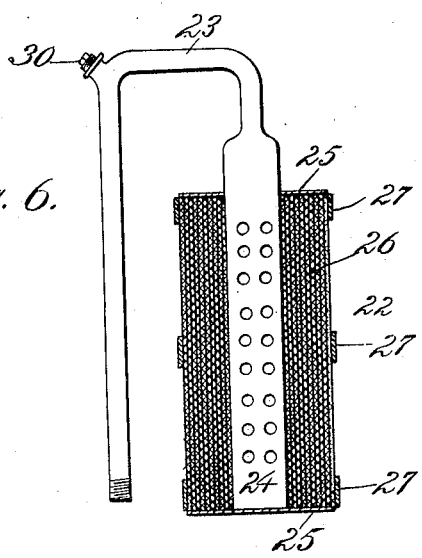

In said drawings, Figure 1 is a central longitudinal vertical section of the apparatus, with parts in elevation. Fig. 2 is a perspective view of a rack for supporting within the mixing-tank the feed-cans which contain and supply the chemical solutions. Fig. 3 is an enlarged vertical cross-section on line 3—3 of Fig. 5, looking in the direction of the arrow, and showing the feed-cans in elevation within the mixing-tank. Fig. 4 is a vertical cross-section through said mixing-tank and feed-cans, on line 4—4 of Fig. 5. Fig. 5 is a top plan view of the entire apparatus. Fig. 6 is a detail sectional view of one of the siphon-filters.

A more particular description of the drawings is as follows: A feed-pipe or inlet-pipe 1 conducts the raw water from a source of supply, as a water-main, to any suitable tank, vessel or receptacle 2, hereinafter called the "mixing-tank", wherein the chemical solutions are introduced. Said feed-pipe 1 is provided with a cock 3, and its mouth or inlet-orifice is controlled by any appropriate device or valve, such as a common float-valve 4, for stopping the supply of water when the water-level in the tank reaches a certain maximum level, at which the float 5 by means of the lever 6 closes the valve. In said mixing-tank 2 are arranged suitable vessels, 7 and 8, hereinafter called the "feed-cans." They contain and supply the aforesaid solutions (a) and (b) to the water, and are provided with means for automatically controlling such supply, so as to insure a uniformly proportionate amount of solution in the water fed into and discharged from the mixing-tank; as, for instance, to supply twenty-five drams of each solution to each ten gallons of water, which may be taken as an example of the quantity or amount of each discharge from the mixing-tank. In this connection, the said feed-cans 7 and 8 are in the form of closed vessels with small outlet orifices 9 in their bottoms (like inverted bottles), said feed-cans being so arranged that their discharge orifices 9 are below the maximum or highest water-level in the mixing tank, preferably considerably below such highest water-level; whereby said solutions are supplied to the water only when the water-level falls below said discharge orifices 9.

The following description of one feed-can will apply to both, reference being had especially to Fig. 4. A transverse partition 10, located below the center of the feed-can, divides the same interiorly into a lower chamber or compartment 11 and a relatively larger upper chamber or compartment 12; there being a short depending discharge-spout or mouth 13 in the bottom of the upper compartment, that is in said partition 10. From the bottom of the feed-can, a tube or pipe 14 leads to near the top of the lower compartment 11, and extends slightly above the level of the lower extremity of the discharge-spout or mouth 13. Another tube or pipe 15 leads from the top of the lower compartment 11 to near the top of the upper compartment 12. By this means, a substantially constant level is always maintained in the lower compartment 11 so long as the upper compartment 12 contains any liquid, since as soon as the fluid-level in the lower compartment falls below the discharge mouth 13, the liquid immediately flows from the upper compartment and restores such level, the flow of liquid being checked as soon as the water rises to the said mouth 13. The pipe 14 supplies air above the surface of the liquid in the lower compartment, only when the water-level in the mixing-tank 2 falls below the discharge orifice 9. Similarly the pipe 15 supplies air for the top of the upper compartment 12, only when the liquid level in the lower compartment 11 falls below the discharge mouth 13. The feed-can is filled by turning it bottom side up and pouring the fluid into the tube 14. A sight-glass or gage 16 attached to the side of the feed-can indicates the level in the upper compartment thereof.

Both feed-cans 7 and 8 being disposed with their discharge orifices 9 on a level, it follows that the supply of the two solutions is coextensively as well as automatically controlled; since the flow of solutions from the cans depends upon the length of time during which the liquid level in the mixing-tank 2 is below the discharge orifices 9, such time being governed partially by the rate of flow from the feed-pipe 1, whose valve is of course opened while the water-level is below such discharge orifices, and being governed partially by the rate of discharge of the water from the mixing-tank, which, as hereinafter mentioned, is effected by a siphon at a more rapid rate than the supply from the feed-pipe.

As a practicable means of supporting the feed-cans 7 and 8, a rack such as shown in Fig. 2 may be used, the same being also shown in Figs. 3 and 4. This comprises a case 17 adapted to receive the feed-cans and having openings 18 therein for the necks of the discharge mouths or orifices 9; said case being formed to fit within the mixing-tank 2 and having inverted U-shaped brackets 19 at its opposite ends which pass over the upper edges of the sides of the tank and thereby suspend the rack and cans at the desired elevation, the set-screws 19ª allowing vertical adjustment.

Below the mixing-tank, or so located relatively thereto as to have a lower water-level, is a tank, vessel or receptacle 20, hereinafter called the "filter-tank", since it contains the filter or filters through which the liquid is clarified. In an apparatus of moderate capacity, the natural position of the mixing-tank would be directly on top of the filter-tank, as shown in Figs. 1 and 5; although such arrangement is not necessary, since the mixing-tank may be placed at any convenient location and at an appropriate level above the filter-tank. Said filter-tank 20 is designed to hold a sufficient quantity of water to cover the filters, and also such additional quantity of liquid as may be delivered from the mixing-tank 2 at one complete discharge or emptying thereof. The liquid is conducted from the upper to the lower tank by means of a siphon 21, whose long arm depends into and below the normal or highest water-level in the filter tank, while its shorter arm extends preferably to near the bottom of the mixing-tank. The bend of said siphon is preferably just below the maximum water-level of the mixing-tank, whereby the rise of water to such level will start the action of the siphon. After the siphon is started, the discharge will of course continue until the mixing-tank is substantially emptied, thus draining off not only such quantity of water as was contained in said mixing-tank, but also such additional quantity as is supplied thereto from the feed-pipe 1 during the action of the siphon; the capacity of discharge of the siphon being considerably greater than the rate of supply from the feed-pipe, as before mentioned. As soon as the water-level in the mixing-tank falls below the inlet of the siphon, the discharge ceases, allowing the mixing-tank to be replenished by the supply from the feed-pipe until its maximum water-level is again attained; whereupon the siphon is again caused to act and empty the mixing-tank; this operation being repeated so long as the water in the filter-tank is below the outlet of the siphon. But if the water in the filter-tank is at its normal level, so that the long arm of the siphon is submerged, then the rise of water in the mixing-tank will not start the siphon, owing to the presence of the confined column of air within the siphon.

As before noted, the transfer of liquid from the mixing-tank into the filter-tank has the effect of more thoroughly intermingling the ingredients, so as to insure the purifying action of the precipitant throughout the bulk of the water.

Within the tank 20 are one or more "siphon filters" 22, arranged either horizontally or vertically, though preferably vertically as shown, and with their siphons passing over or through the sides of said tank. A description of one of such siphon filters will suffice. It comprises a siphon 23, whose short arm within the tank is connected with the filter proper 22 through which the liquid is drawn by the action of the siphon. As shown in Fig. 6, the said filter proper comprises a central core or tube 24, having thereon two flanges or disks 25 spaced apart as shown, and between which the tube is perforated or fenestrated to admit ingress of water. Between said disks 25 the perforated tube 24 is surrounded by the filtering material 26, which is wrapped or otherwise filled thereon, and which may consist of gauze, cheesecloth, muslin, flannel, felt, cotton or other fabric, mineral wool, wood wool, filter paper or other suitable material, or a combination of these. Preferably said filtering material is wrapped around the tube in the form of layers, and it is secured thereon by suitable retaining devices such as a reticulated metal jacket, or by means of tapes or by metal bands 27 as shown. The tube 24, which may be of metal, glass, earthenware, or any appropriate material, is connected with the inner arm of the siphon 23, being either jointed thereto or integral therewith; in other words, the tube 24 is virtually a part of the siphon. The inner or lower end of the tube is closed.

Outside the filter-tank the siphon 23 extends down below the maximum or normal water-level of the tank, and preferably as far down as the bottoms of the filters, since the longer the outer leg of the siphon the more forceful will be its action in drawing the water through the filter. At its lower point, the siphon may connect by a pipe joint with an extension-pipe 28 for conducting the purified and filtered water to a suitable receptacle, or to the location where the purified water is to be supplied; said pipe being provided with a cock 29 for shutting off the flow of water at will; and in this connection it will be observed that the shutting off of the water in the siphon 23 will automatically stop the action of the entire apparatus, assuming the water-level in the filter-tank to be above the long branch of the siphon 21, excepting of course that if said siphon 21 is already in action the flow will continue therethrough until the mixing-tank is emptied, and said mixing-tank will then be replenished until the water attains its maximum level therein; further action of the apparatus being checked until the siphon 21 is again set in operation by a lowering of the level in the filter-tank. To start the siphon 23, it is provided at the upper part of its long branch or leg with an opening which is closed by the plug or cap 30. On removing said plug liquid can be poured in to start the siphon, as hereinafter explained.

The apparatus as a whole is preferably so stationed as to locate the filter-tank 20 at a higher level than the discharge end or ends of the siphon or siphons 23, the action of the siphons being stronger in proportion to the extent of their discharging branches below the level of said tank. For example, an apparatus of ordinary capacity as represented in the drawings is desirably placed upon a stand about four feet six inches high.

The operation of the apparatus may be briefly summarized as follows: The feed-cans 7 and 8 having been filled with their respective solutions, and having been placed in proper position within the mixing-tank 2, the water is turned on by opening the cock 3 of the feed-pipe 1. As the water flows into the mixing-tank, the solutions (a) and (b) are also fed or discharged from the feed-cans 7 and 8, until the water rises to the discharge-orifices 9 of said feed-cans, whereupon the supply of solutions ceases: although the inflow of water continues until stopped by operation of the float-valve 4. By that time, the water-level has reached the summit of the curve or bend of the siphon 21, thus starting said siphon, assuming the discharge end thereof to be exposed to the air or above any water-level in the filter-tank 20. The siphon now discharges the liquid into the filter-tank 20, substantially emptying or draining the upper tank, whereupon the siphon becomes inactive and remains so until the inflowing water again reaches such a level in the upper tank as to renew the siphonic action. As soon as the water-level falls below the discharge openings 9 of the feed-cans 7 and 8, they renew and continue the supply of solutions until the water again rises to such openings; whereby a uniform quantity of the solutions is delivered for each quantity of water that flows into and discharges from the mixing-tank at one operation of the siphon 21. This operation is repeated until the level of the water in the filter-tank 20 covers the tops of the filters 22, at which level the discharge-mouth or lower end of the long leg of the siphon 21 is also submerged. The mixing-tank 2 will then cease to discharge (excepting to allow completion of action of the siphon if already in progress when such level is reached in the filter-tank), but overflow in the upper or mixing-tank is nevertheless prevented by the operation of the float-valve 4. Any one or more of the siphon-filters 22 can now be put in action, by withdrawing the plug 30, closing cock 29, filling the siphon-tube with water, then replacing plug 30 and opening cock 29. This sets the siphon-filter in operation; and as soon as the water-level in the filter-tank falls below the long arm of the siphon 21 from the mixing-tank, the latter will again discharge and replenish the level in said filter-tank. This process may be repeated indefinitely, the siphon-filters 22 being allowed to operate continuously; or they may be shut off at will, the operation in the mixing-tank being also automatically checked in the manner explained.

Having thus fully described my invention, what I claim as new and desire to secure by Letters Patent of the United States is:—

1. An apparatus for purifying water comprising, in combination, a filter-tank or vessel, a filtering medium therein and a siphon arranged to draw the water through said filtering medium, a mixing-tank or vessel located at a higher level, means for supplying water thereto with automatic controlling means to prevent the rise of water above a certain level in said mixing tank, automatic means for feeding chemicals to the water in said mixing tank only when the water is below a certain level therein, and a siphon arranged to discharge the water from said mixing tank when the water therein has attained said first-mentioned level, said siphon having a greater rate of discharge than the inflow of water to said mixing tank.

2. An apparatus for purifying water having, in combination, a mixing tank or vessel, means for supplying water thereto with automatic controlling means to prevent the rise of water above a certain level, automatic means for feeding chemicals to the water in said vessel only when the water is below a certain level, a siphon arranged to discharge the contents of said vessel when the water therein attains the first-mentioned level, said siphon having a greater rate of discharge than the inflow of water, and means for filtering the water discharged from said vessel.

3. An apparatus for purifying water having, in combination, a filter-tank or vessel, a siphon arranged to conduct water therefrom, a filter through which the water is drawn by the action of said siphon, a relatively higher mixing-tank or vessel, a siphon arranged to discharge the water therefrom to said filter-tank, said siphon having its discharge branch depending below the maximum water-level in the filter-tank but above the minimum level at which the filter is covered, means for supplying water to the mixing-tank to a level to start the second-mentioned siphon, and means for supplying a definite amount of chemicals to such quantity of water as is taken from the mixing tank at one discharge of said siphon.

4. An apparatus for purifying water having, in combination, a filter-tank or vessel, a siphon arranged to conduct water therefrom, a filter through which the water is drawn by the action of said siphon, a relatively higher mixing-tank or vessel, a siphon arranged to discharge the water therefrom to said filter-tank, said siphon having its discharge branch depending below the maximum water-level in the filter-tank but above the minimum level at which the filter is covered, a water supply to the mixing-tank with automatic controlling means to limit the flow to such level as will start the discharge siphon therefrom, said siphon having a greater rate of discharge than the rate of said supply, and chemical-feeding means operative only below a certain level in said mixing-tank.

5. An apparatus for purifying water having, in combination, a mixing-tank or vessel, means for successively supplying a substantially uniform quantity of water thereto, means for mixing with such quantity of water definite amounts of chemicals to form a precipitate therein, means for repeatedly conducting off such quantity of water, and a filter and siphon by means of which the water is drawn through said filter.

6. An apparatus for purifying water having, in combination, a mixing-tank or vessel, means for successively supplying a substantially uniform quantity of water thereto, means for mixing with such quantity of water definite amounts of chemicals to form a precipitate therein, a siphon arranged to discharge such quantity of water, and means for filtering the water.

7. An apparatus for purifying water having, in combination, a mixing-tank or vessel, a water inlet thereinto with automatic controlling means whereby the supply of water is shut off when a certain level is attained, automatic means for supplying chemical solutions to the water operative only below a certain level, means for discharging the water from said tank when said first-mentioned level is attained, and means for filtering the water so discharged.

8. In an apparatus for purifying water, the combination of a liquid tank or vessel, means for supplying water thereto, and solution feed-cans comprising closed reservoirs having discharge orifices in their bottoms, said orifices being arranged to be submerged below the water at a certain level.

9. In an apparatus for purifying water, the combination of a mixing-tank or vessel, means for supplying water thereto, means for discharging water therefrom, and a solution feed-can consisting of a closed reservoir having a discharge orifice in its bottom, which orifice is arranged to be submerged at a certain water-level, said feed-can having an interior partition dividing the same into a lower and upper compartment, the upper compartment having a discharge mouth in its bottom, an air tube extending from the bottom of the feed-can to near the top of the lower compartment, and an air-tube extending from the top of said lower compartment to near the top of said upper compartment, whereby a constant level is maintained in the lower compartment.

10. In an apparatus for purifying water, the combination of a mixing-tank or vessel, means for supplying water thereto, a rack adjustably supported in said tank to allow for adjusting the vertical position thereof, and a solution feed-can supported by said rack consisting of a closed reservoir having a discharge orifice in its bottom, whereby the feed-can can be adjusted to have tis discharging orifice submerged at different water-levels, to vary the quantities of solution to be fed to a given quantity of water.

11. In an apparatus for purifying water, the combination of a suitable liquid-containing vessel, means for subjecting the water supplied thereto to the action of a chemical solution to form a precipitate, a submerged filtering medium in said vessel, and a siphon for drawing off the water through said filtering medium.

12. In an apparatus for purifying water, the combination of a mixing tank, means for subjecting a quantity of water therein to the action of chemicals to form a precipitate, means for running off the water together with the precipitate into a receptacle at a lower level, a filtering medium in said receptacle, and means for drawing the water by siphonic action through such filtering medium.

13. In an apparatus for purifying water, the combination of a mixing tank or vessel, means for successively supplying thereto a substantially uniform quantity of water, means for introducing precipitate-forming chemicals to such water, automatic means for repeatedly running off such quantity of water to a lower level, a filtering medium, and means for drawing off the water by siphonic action through said filtering medium.

14. In an apparatus for treating water, the combination of a mixing tank or vessel, means for supplying water thereto to a given level, means for discharging the water when such level is attained, and chemical feeding means operating to supply a chemical to the water only when below a certain level lower than the maximum water level.

15. In an apparatus for treating water, the combination of a mixing tank or vessel, means for supplying water thereto, a siphon arranged and having sufficient capacity for discharging the water from said tank when the water reaches a level to operate the siphon, and means for feeding a definite proportion of chemical substance to every such quantity of water in the tank that is discharged by one action of said siphon.

16. In an apparatus for treating water, the combination of a mixing tank or vessel, means for supplying water thereto, a siphon for discharging the water from said tank when the water therein reaches a level to operate said siphon, and a closed solution-feeding receptacle in said tank having a discharge orifice below the summit of the siphon.

17. In an apparatus for treating water, the combination of a tank or vessel, means for supplying water thereto, a closed solution-feeding receptacle in said tank having a bottom discharge orifice which is submerged except when the water is below the level of such orifice, and automatic means for discharging the water from said tank when a certain level is reached.

18. In an apparatus for treating liquids, the combination of a mixing tank, means for supplying liquid to and discharging it from said tank, and a solution feed-can in said tank comprising a closed reservoir having a lower discharge orifice which is submerged except when the liquid is below a certain level, and means for maintaining a substantially constant level, in said feed-can.

In testimony whereof I affix my signature, in presence of two witnesses.

CARL ROGER DARNALL.

Witnesses:
OSGOOD H. DOWELL,
I. M. LAUBER.